United States Patent
Ballarini et al.

(10) Patent No.: US 7,249,863 B2
(45) Date of Patent: Jul. 31, 2007

(54) SOLAR-POWERED LIGHTING SYSTEM

(76) Inventors: Noelle L. Ballarini, 8242 Shawnee St., Philadelphia, PA (US) 19118; Robert J. Ballarini, 8242 Shawnee St., Philadelphia, PA (US) 19118

( * ) Notice: Subject to any disclaimer, the term of this patent is extended or adjusted under 35 U.S.C. 154(b) by 223 days.

(21) Appl. No.: 10/834,295

(22) Filed: Apr. 28, 2004

(65) Prior Publication Data

US 2004/0212997 A1 Oct. 28, 2004

Related U.S. Application Data

(60) Provisional application No. 60/465,937, filed on Apr. 28, 2003.

(51) Int. Cl.
*F21S 6/00* (2006.01)
(52) U.S. Cl. ............... 362/121; 362/183; 362/276; 362/802; 362/807
(58) Field of Classification Search ......... 362/121, 362/157, 183, 276, 802, 806–807
See application file for complete search history.

(56) References Cited

U.S. PATENT DOCUMENTS

| 4,339,787 A | * | 7/1982 | Burnbaum | 362/121 |
| 4,384,317 A | * | 5/1983 | Stackpole | 362/183 |
| 5,467,257 A | * | 11/1995 | Shalvi | 362/183 |
| 5,558,422 A | * | 9/1996 | Sanford | 362/565 |
| 6,554,448 B2 | * | 4/2003 | Carpenter et al. | 362/161 |
| 6,612,713 B1 | * | 9/2003 | Kuelbs | 362/102 |

FOREIGN PATENT DOCUMENTS

| DE | 8900563 U1 | * | 11/1989 |
| DE | 19708397 A1 | * | 9/1998 |

* cited by examiner

*Primary Examiner*—Sandra O'Shea
*Assistant Examiner*—Jason Moon Han
(74) *Attorney, Agent, or Firm*—Robert J. Ballarini

(57) ABSTRACT

The present invention relates to a solar-powered lighting system that may be used to decorate trees and other outdoor items. The system of the present invention comprises a solar energy gatherer that converts solar energy to electrical energy, a storage battery, a light sensor or photoresistor that detects ambient light, and at least one lamp.

5 Claims, 5 Drawing Sheets

SOLAR-POWERED LIGHTING SYSTEM

RELATED APPLICATIONS

This application claims benefit of U.S. Provisional Patent Application 60/465,937, filed Apr. 28, 2003, the disclosure of which is incorporated herein in its entirety.

FIELD OF THE INVENTION

The present invention relates to the field of outdoor lighting, in particular solar-powered lighting for holiday displays.

BACKGROUND OF THE INVENTION

Many people decorate their homes and properties for holidays. One such custom is to place lights on trees at Christmas time. Often homeowners are required to provide long extension cords to remote areas where they wish to decorate. This is sometimes inconvenient due to logistical reasons. Furthermore, the user is using additional electricity to provide the lights with power. Unless a separate timer or light sensor is added to the lighting strand, the user must be vigilant in turning off lights as to not waste power.

SUMMARY OF THE INVENTION

Accordingly, it is an object of the present invention to provide a lighting system that is self-powered. The present invention relates to a solar-powered lighting system that may be used to decorate trees and other outdoor items. The system of the present invention comprises a solar energy gatherer that converts solar energy to electrical energy, a storage battery, a light sensor or photoresistor that detects ambient light, and at least one lamp.

DETAILED DESCRIPTION OF THE DRAWINGS

The above will become more apparent to those skilled in the art after a consideration of the following detailed description taken in conjunction with the accompanying drawings which a presently preferred form of this invention is illustrated.

Figure 1:
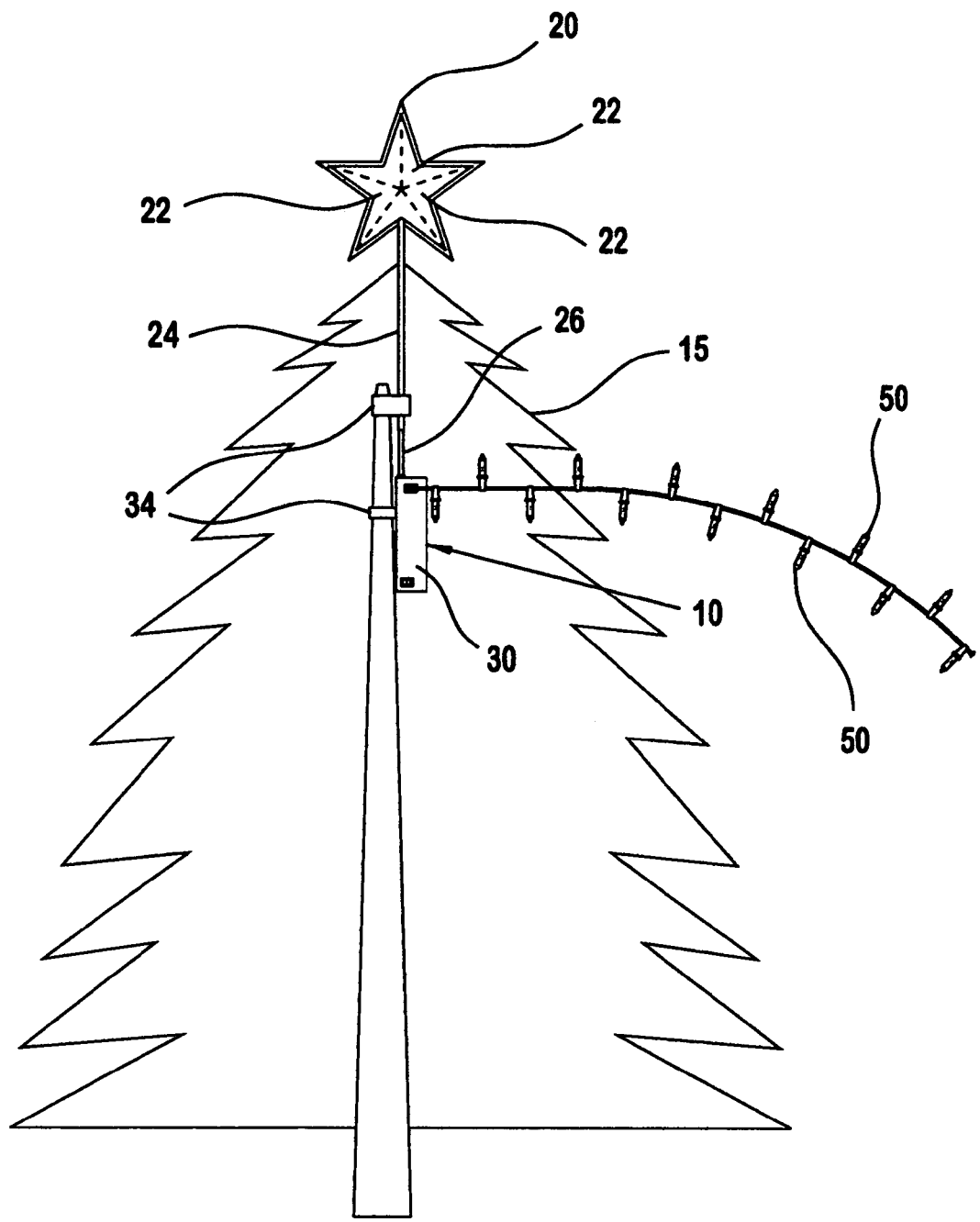
FIG. 1 is a depiction of the present invention in use as a Christmas lighting set.

There is illustrated in FIG. 1 an outdoor lighting system of the present invention generally indicated as 10. The system 10 utilizes one or more solar energy gatherers 20 to generate electricity that is then stored in a rechargeable storage battery 30. The battery 30 may he a nickel-cadmium (Ni-Cad), lithium ion, lead-add or other suitable battery. A solar energy gatherer 20 generally comprises one or more solar panels 22. The panels may be flexible, able to assume curved orientations. The solar panel is comprised of solar veils (not shown). A solar cell is a semiconductor device that converts the energy of sunlight to electricity. The solar energy gatherer 20 is depicted as a star in FIG. 1 for illustrative purposes but it should be understood that the solar energy gatherer 20 may have other configurations corresponding to other holidays, for example, a sphere, an onion shape, a cross, a crescent moon, a pumpkin, etc. The solar energy gatherer 20 may also be of a plain rectangular or circular shape. The solar energy gatherer may further comprise a photoresistor and a motor that will turn or tilt the solar energy gatherer to properly position the gatherer for maximum efficiency.

Solar energy gatherer 20 depicted in FIG. 1 is configured for placement on top of a tree 15, much like a traditional Christmas tree top. By placing the solar energy gatherer 20 atop the tree 15, there is more sunlight for the solar panels to convert to electrical energy. The solar energy gatherer 20 may be affixed to the tree 15 by way of a securing member 24. The securing member 24 may be tied to the tree to ensure that the solar energy gatherer 20 remains in place to maximize light gathering efficiency. Alternatively, the solar energy gatherer 20 may be able to rotate on an axis of the retaining member 24 to follow the movement of the sun for maximum solar exposure. Solar energy gatherer 20 may also be able to rotate about an axis of the retaining member 24 when the wind blows generating energy in the same way as a windmill does.

Figure 2:
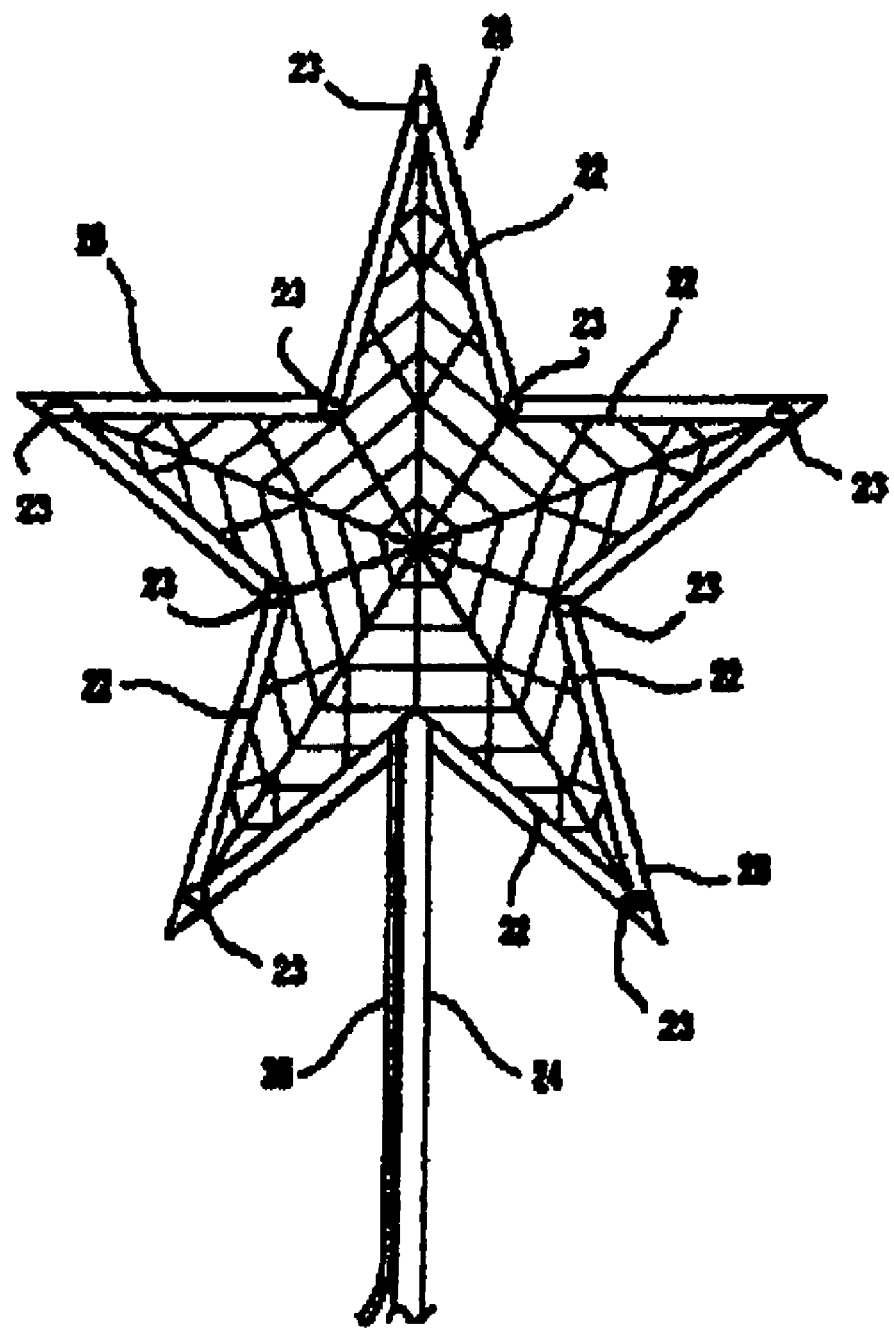
FIG. 2 is a depiction of the solar gatherer of the present invention.

As shown in FIG. 2. solar energy gatherer 20 with solar panels 22 is configured in the shape of a star. The configuration of the solar panels 22 is such that the star has a solar panel at a variety of angles and orientations to maximize sunlight gathering. The solar energy gatherer 20 also comprises an outer weather-resistant housing 28. The solar energy gatherer 20, may also comprise one or more lamps 23 disposed within housing 28, around its periphery to outline the shape of the solar energy gatherer 20 and give it a decorative appearance when the lamps are lit. Furthermore, solar energy gatherer 20 may also comprise a motor to rotate solar energy gatherer 20 when illuminated.

Lamps 23 may be disposed within a portion of housing 28 having a luminous material, i.e. a glow-in-the-dark material, that is charged with light when lamp 23 is illuminated. A processor (not shown in the drawings) may be utilized to alternate turning lamps 23 on and off. When the lamps 23 are on, the luminous material is charged with light and will emit a noticeable glow when lamp 23 is not illuminated. Furthermore, the use of a processor allows the lights to be illuminated at intervals creating a flashing effect. This allows for less battery power to be used without compromising the lighting effect. To further maximize battery capacity, light emitting diodes (LEDs) may be used as lamps 23. LEDs use less power as compared to standard bulbs, and are available in various colors.

Figure 3:
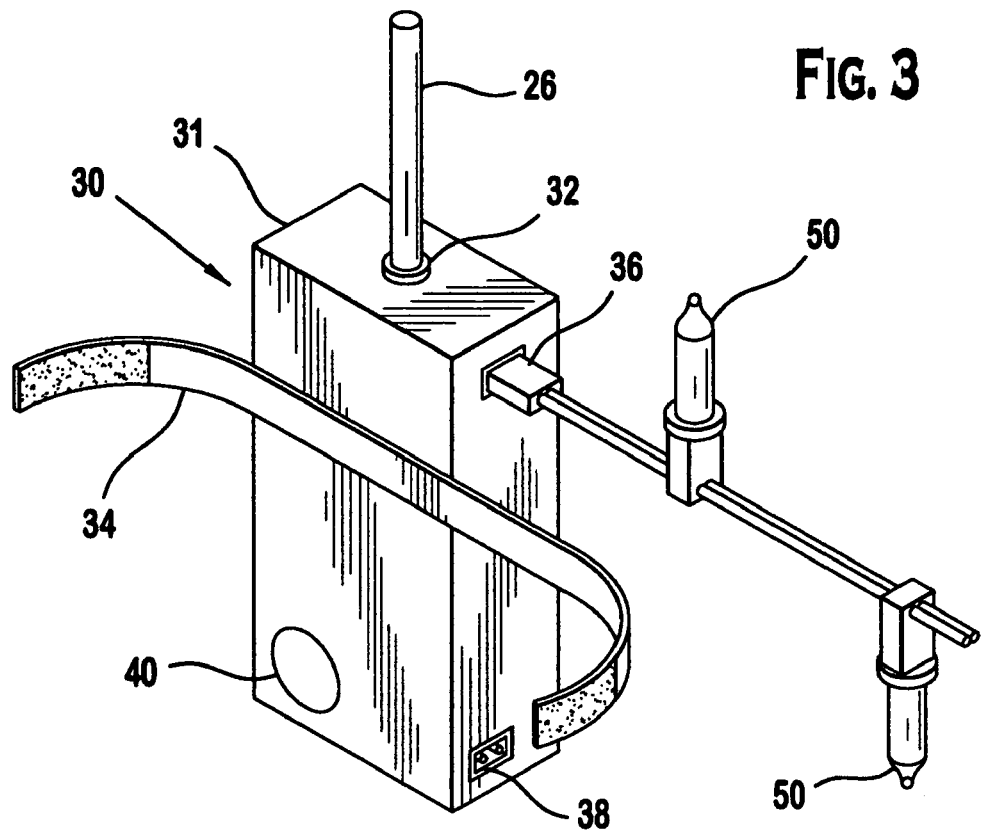
FIG. 3 is a depiction of the battery of the present invention.

As shown in FIG. 3, a light sensor or a photoresistor 40 is in communication with battery 30. When the amount of ambient light as determined by photoresistor 40 is determined to be below a predetermined level, it will switch the battery 30 from a charging mode to a lighting mode. In the lighting mode, the battery 30 provides power to one or more lamps 50 that are also in communication with the battery 30. The battery 30 provides power to the lamps 50 by lead 36.

The battery 30 comprises a weather-resistant housing 31 and an input 32 that receives electrical lead 26 from the solar energy gatherer 20. Battery 30 also comprises an output 36 to lamps 50. Strap 34 is used to secure the battery 30 to a limb or trunk of tree 15. Alternatively, the battery may comprise a stake (not shown) for securing the battery to the ground.

Figure 4:
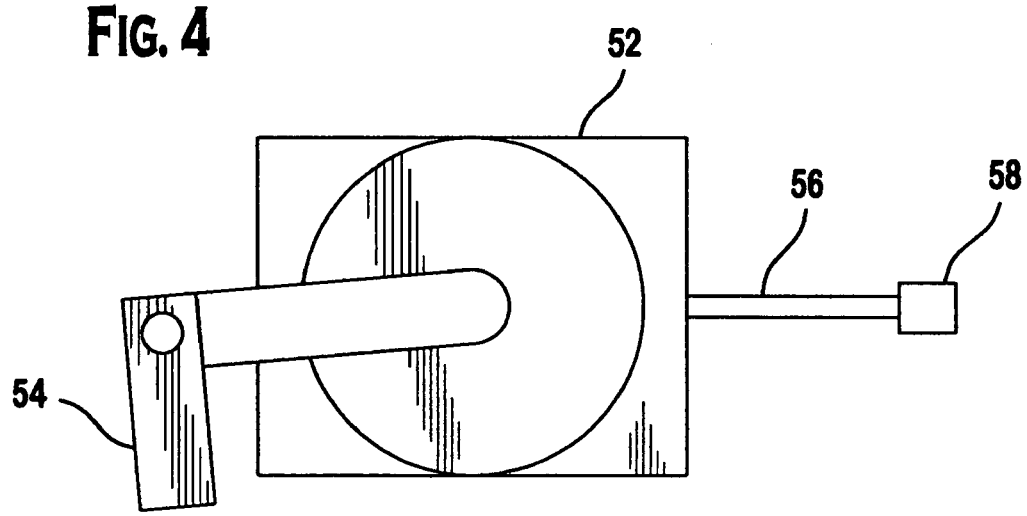
FIG. 4 is a depiction of a manual charger for use with the present invention.

Alternatively, battery 30 may also comprise an interface 38 for an external charger 52 (FIG. 4). An external charger may be a manual charger such as a hand crank as shown in FIG. 4, foot pedal (not shown), etc. that could be used on days where there is insufficient sunlight to charge the battery. The charger 52 has crank 54 and lead 56 and connector 58 that matingly engages interface 38 to make an electrical connection. Once the connector 58 is connected to the interface 38, the crank 54 is turned to drive a generator to create an electrical charge that is carried by lead 56 to the connector 58 and interface 38 to the battery 30.

Figure 5:
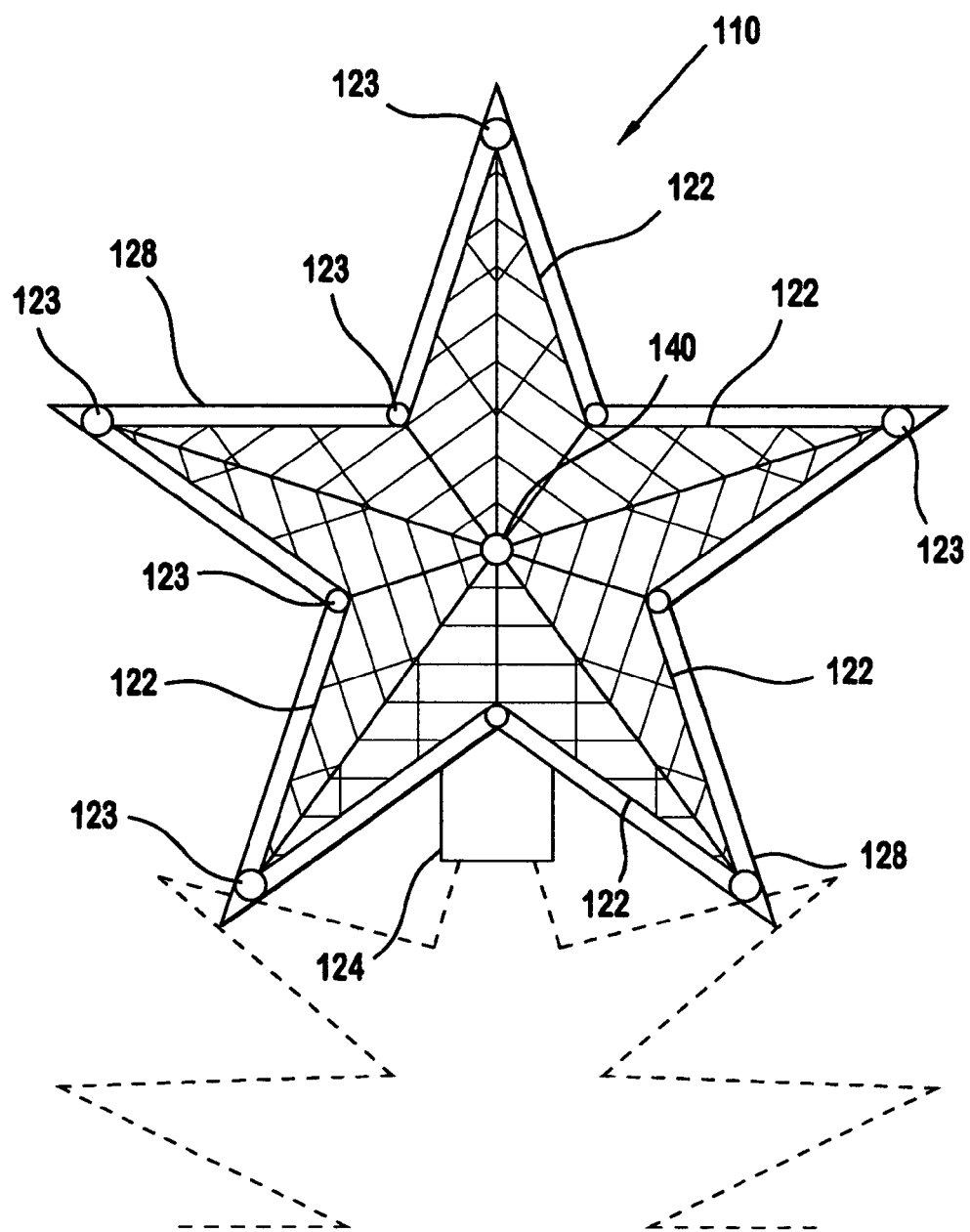
FIG. 5 is a depiction of an alternate embodiment of the present invention.

Alternatively, the solar power lighting system of the present invention may comprise a single unit 110 as shown in FIG. 5. In this embodiment, housing 120 contains solar panels 122 as well as battery (not shown). Securing member 124 secures the unit 110 to a fixed object, in this example, a tree (shown in phantom). Lights 123 as well as photoresistor 140 are contained within the housing 120. The housing further comprises a weatherproof seal 128.

The present invention has been exemplified above as a Christmas lighting set, but it should be understood that the present invention may be applied to different holidays and for general lighting use.

Figure 6:
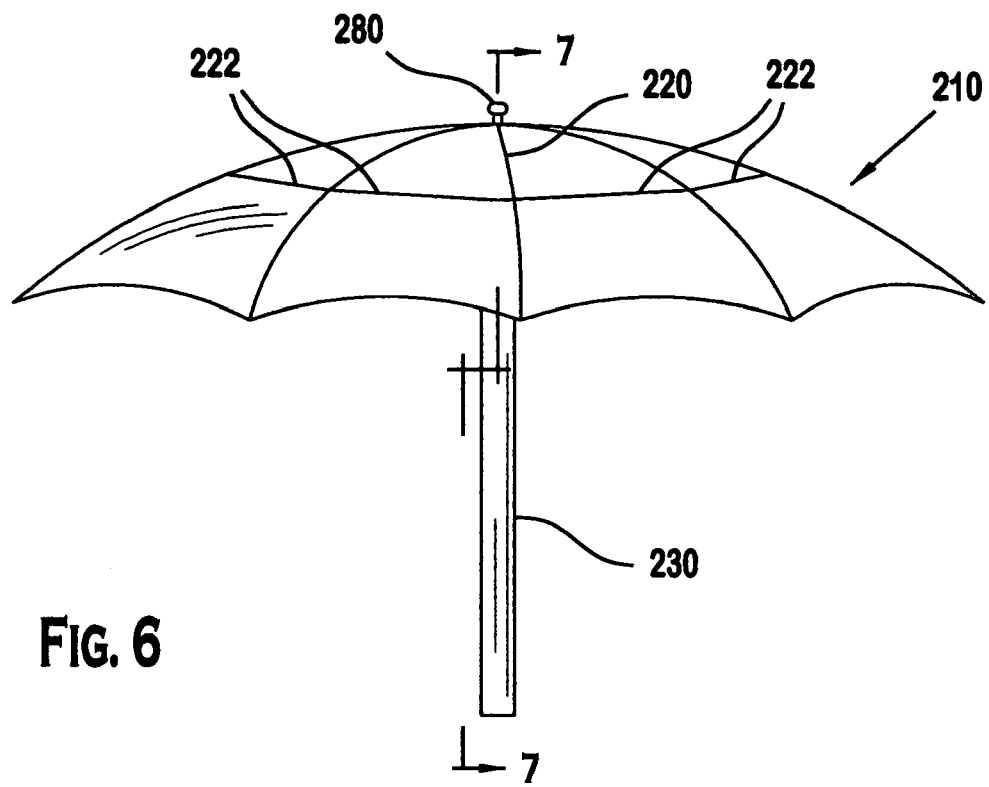
FIG. 6 is a depiction of a further alternate embodiment of the present invention.
Figure 7:
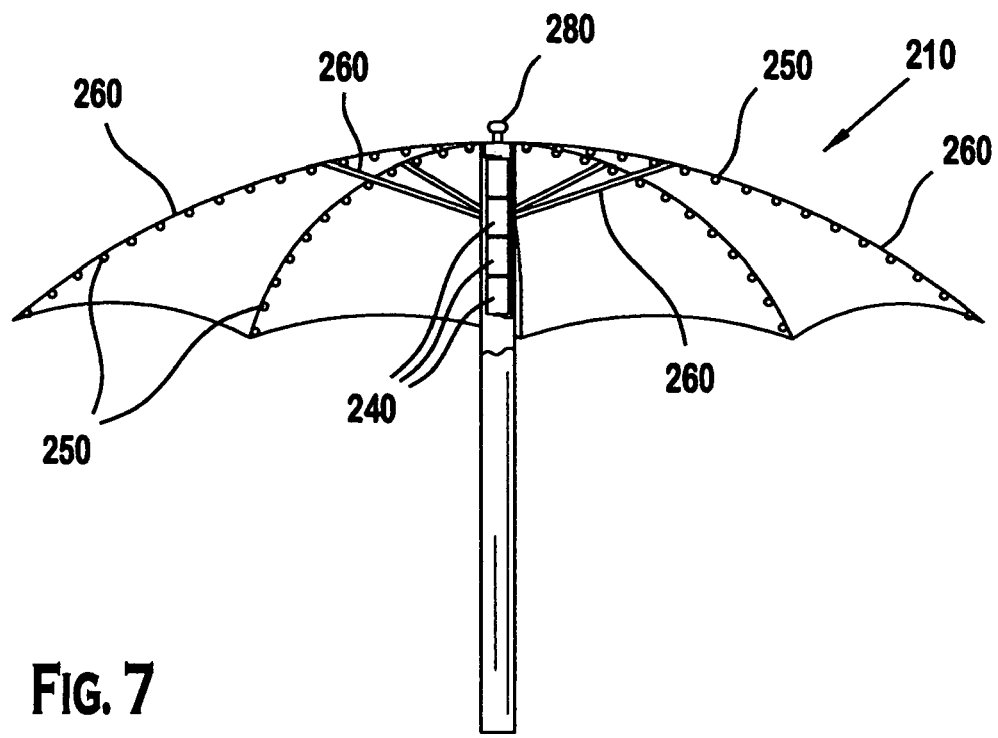
FIG. 7 is a cross section of FIG. 6 taken along line 7—7.

A further alternate embodiment is shown in FIGS. 6 and 7. The invention in this embodiment is applied to umbrellas, for example patio or "bistro" umbrellas. Umbrella 210 comprises solar energy gatherers 220, comprising one or more solar panel 222. Said energy gatherers 220 are arranged around the top of the umbrella 210. The shaft 230 of the umbrella 210 may house one or more rechargeable battery 240. By housing the batteries in the shaft, utilization of space is maximized as well as reinforcement of the shaft 230 which is normally hollow. Lights 250 are arranged about the umbrella's ribs 260 of the underside of the umbrella 210. Photoresistor 280 detects ambient light and switches the battery 240 from a charging mode to a power mode when the ambient light detected is of a predetermined value. In power mode the battery 240 provides power to lights 250 to illuminate them. As above, the solar energy gatherers are arranged on top where there is more sunlight to convert to electrical energy. Electrical energy is stored in the one or more rechargeable battery 240.

It will be understood that the foregoing description and illustration is by way of example only and that such modifications and changes as may suggest themselves to those skilled in the art are intended to fall within the scope of the present invention as defined by the appended claims.

What is claimed is:

1. A solar-powered lighting system comprising:
    a) a solar energy gatherer that gathers and converts solar energy into electrical energy, comprising a plurality of solar panels arranged at different angles relative to a horizontal plane the solar energy gatherer in communication with;
    b) a battery that is recharged by the electricity produced by the solar energy gatherer;
    c) at least one lamp electrically connected to the battery; and
    d) a switch connected between the battery and the at least one lamp that switches between a charging mode and a power mode, wherein the solar energy gatherer is a star-shaped tree-top ornament;
    e) a housing comprising of a glow-in-the-dark material.

2. The solar-powered lighting system of claim 1, wherein the switch is a photoresistor.

3. The solar-powered lighting system of claim 1, wherein, the system is housed in a single unit.

4. The solar-powered lighting system of claim 1, wherein the at least one lamp is a light emitting diode.

5. The solar-powered lighting system of claim 1, wherein the battery comprises an interface for a manual charger.

* * * * *